(12) United States Patent
Kim

(10) Patent No.: US 7,044,550 B2
(45) Date of Patent: May 16, 2006

(54) REAR SEAT HAVING A BACKREST IMPLEMENTED WITH A BACK BOARD

(75) Inventor: Seok Hwan Kim, Gunpo (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 11/010,010

(22) Filed: Dec. 10, 2004

(65) Prior Publication Data
US 2005/0236882 A1    Oct. 27, 2005

(30) Foreign Application Priority Data
Apr. 22, 2004    (KR) .................. 10-2004-0027671

(51) Int. Cl.
*A47C 7/00*    (2006.01)
(52) U.S. Cl. .................. 297/283.3; 297/378.1; 297/119; 297/126; 297/129; 296/65.09; 296/66; 296/69
(58) Field of Classification Search .......... 297/378.1, 297/15, 94, 114, 283.3, 119, 125, 126, 128, 297/129; 296/65.09, 66, 69
See application file for complete search history.

(56) References Cited

U.S. PATENT DOCUMENTS

| | | | |
|---|---|---|---|
| 4,519,646 A * | 5/1985 | Leitermann et al. | 297/15 |
| 5,941,602 A * | 8/1999 | Sturt et al. | 297/378.1 |
| 6,540,295 B1 * | 4/2003 | Saberan et al. | 297/378.1 |
| 6,648,395 B1 * | 11/2003 | Hoshino | 296/66 |
| 6,874,840 B1 * | 4/2005 | Neale | 296/66 |

FOREIGN PATENT DOCUMENTS

FR    2660260 A1 *    10/1991
JP    2001-270388        10/2001

* cited by examiner

*Primary Examiner*—Anthony D. Barfield
(74) *Attorney, Agent, or Firm*—Morgan Lewis & Bockius LLP

(57) ABSTRACT

A rear seat having a backrest provided with a back board includes a first link member, a second link member, a sliding member, an elastic member, and a stopper. The back board is arranged to be automatically deployed by the elastic member in such a manner that the movement of the sliding member integrated with the back board is controlled in conjunction with a folding condition of the backrest. Accordingly, in the present invention the drawbacks such as falling or sticking of a luggage are effectively addressed.

9 Claims, 2 Drawing Sheets

REAR SEAT HAVING A BACKREST IMPLEMENTED WITH A BACK BOARD

CROSS-REFERENCE TO RELATED APPLICATIONS

This application claims priority of Korean Application No. 10-2004-0027671, filed on Apr. 22, 2004, the disclosure of which is incorporated fully herein by reference.

FIELD OF THE INVENTION

The present invention relates to a rear seat having a backrest implemented with a back board, particularly to a rear seat having a backrest provided with a back board, in which the back board installed on the backside of the backrest is automatically deployed so as to cover a gap between a front seat and the backrest of the rear seat when the backrest of the rear seat is folded into a flat position.

BACKGROUND OF THE INVENTION

In general, a van or a sports utility vehicle (SUV) is provided with two or three rows of rear seats that are foldable in various arrangements so as to ensure room for loading. For example, a backrest of the rear seat can be tilted forward into a flat position in order to ensure a sufficient luggage space.

However, such a foldable rear seat is disadvantageous in that a gap or an opening is formed between the backrest of the rear seat and a front seat (particularly, between a headrest mounted on the upper end of the backrest and a backside of the backrest of the front seat) when the backrest is folded into a flat position, whereby luggage falls through the opening or part of the luggage is stuck therebetween. Considering the foregoing drawback, a conventional rear seat is furnished with a back board installed at a backside of a backrest thereof so as to facilitate loading of luggage.

The rear seat employing a sliding-type back board is disadvantageous, however, in that the operation of the back board is manually performed whenever it is needed to pull it out or push it in.

Another example of a rear seat having a back board uses a Velcro-type back board. However, Velcro type back boards are not aesthetically pleasing. Moreover, the Velcro tends to be easily worn out or malfunction after repeated use over a long period of time.

SUMMARY OF THE INVENTION

The present invention provides a rear seat having a backrest provided with a back board, in which the back board installed on the backside of the backrest is automatically deployed by an elastic member so as to cover a gap between a front seat and the backrest of the rear seat when the backrest of the rear seat is folded into a flat position.

One embodiment of a rear seat according to the present invention includes a seat cushion; a hinge bracket rigidly fixed to a side of the seat cushion; a backrest rotatably engaged with the hinge bracket; a first link member, of which the proximal end is rotatably coupled to the hinge bracket; a second link member of which the proximal end is connected to the distal end of the first link member; a sliding member connected to the distal end of the second link member; a rail member for accommodating the sliding member therein, the rail member being installed to the side of the backrest; a fixing member installed at the upper end of the rail member; an elastic member, of which one end is coupled to the sliding member and the other end is coupled to the fixing member, the elastic member being then compressed or extended in the rail member in accordance with the movement of the sliding member; a back board integrally formed with the sliding member; and a stopper formed adjacent to the lower end of the backrest, the stopper restraining the rotation of the first link member within a certain limit. The back board is initially located on the backside of the backrest. With such an arrangement, the back board moves back and forth in accordance with the movement of the elastic member In the embodiment, the sliding member is provided with a hooking member which is integrally formed therewith on the surface facing the rail member. Moreover, the rail member is provided with a groove therein in a longitudinal direction, in which the hooking member is slideably inserted. In another embodiment, the elastic member is a spring.

In another embodiment, a pivot axis of the first link member upon the hinge bracket is positioned ahead of a pivot axis of the backrest upon the hinge bracket. Furthermore, in another embodiment, the stopper is located behind a pivot axis of the backrest upon the hinge bracket when the backrest is in an upright position. When the backrest is tilted forward into a flat position, the stopper is located ahead of a pivot axis of the backrest upon the hinge bracket.

In another embodiment, an angle between the first link member and the second link member in a flat position of said backrest is greater than that in an upright position of said backrest.

BRIEF DESCRIPTION OF THE DRAWINGS

The aforementioned aspects and other features of the present invention will be explained in the following description, taken in conjunction with the accompanying drawings, wherein:

FIGS. 2a and 2b are side views of a rear seat according to an embodiment of the present invention, wherein FIG. 2a illustrates an initial position of a back board in an upright position of a backrest, and FIG. 2b illustrates a deployment of a back board in a flat position of a backrest.

DETAILED DESCRIPTION OF THE PREFERRED EMBODIMENT

Figure 1:
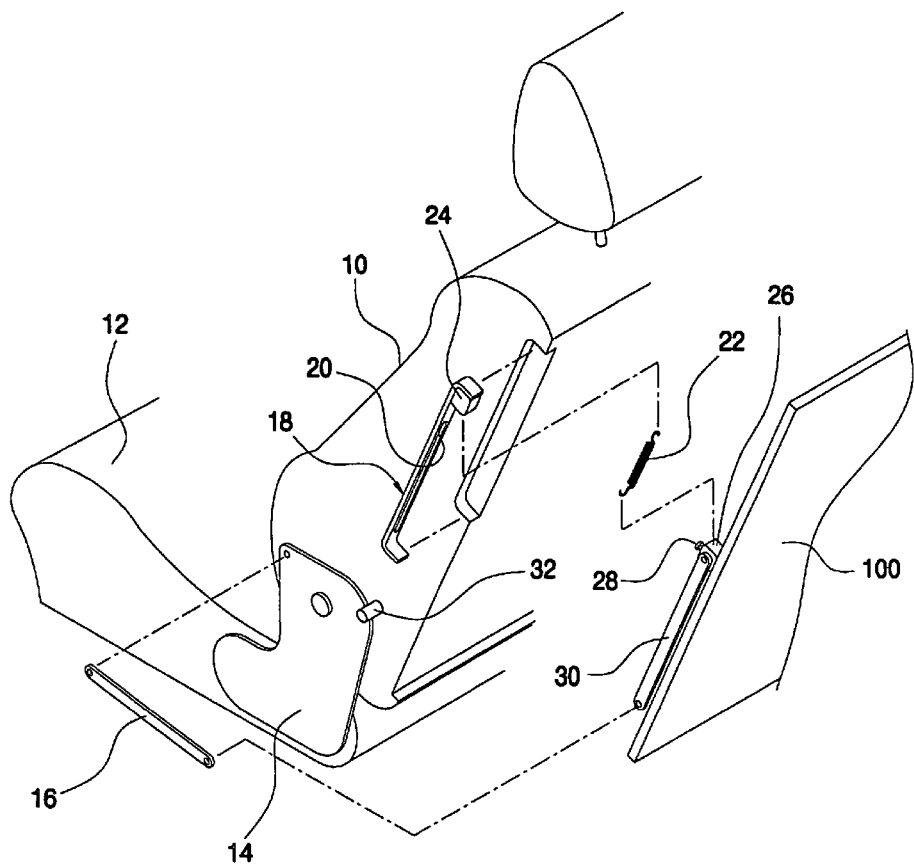
FIG. 1 is an exploded, perspective view showing a rear seat according to an embodiment of the present invention.

Hereinafter, a preferred embodiment of the present invention is described in detail with reference to the accompanying drawings. As shown in FIG. 1, the rear end of a seat cushion 12 and the lower end of a backrest 10 are coupled by a hinge bracket 14 wherein the backrest 10 is capable of rotating on a pivot axis of the hinge bracket 14 with respect to the fixed seat cushion 12. One end of a first link member 16 is rotatably coupled to the front-upper end of the hinge bracket 14.

A lateral side of the backrest 10 is furnished with a rail member 18 on which a groove 20 is formed along its length. The rail member 18 comprises a fixing member 24 installed at the upper end thereof, at which one end of a spring 22 is fixed. A back board 100 integrally formed with a sliding member 26 on its front surface is arranged to closely contact with the backside of the backrest 10. In particular, the sliding member 26 has a hook member 28 to be inserted into the groove 20 of the rail member 18 so as to prevent the sliding member 26 from escaping from the rail member 18. In the rail member 18, as previously mentioned, one end of the spring 22 is fixed to the fixing member 24 and the other end of the spring 22 is fixed to the sliding member 26.

Disposed between the first link member 16 and the sliding member 26 is a second link member 30. Namely, one end of the second link member 26 is hinged to the distal end of the first link member 16 and the other end of the second link member 26 is hinged to the sliding member 26. The backrest 10 is further provided with a stopper 32 that restrains the rotation of the first link member 16 within a certain limit.

Figure 2A:
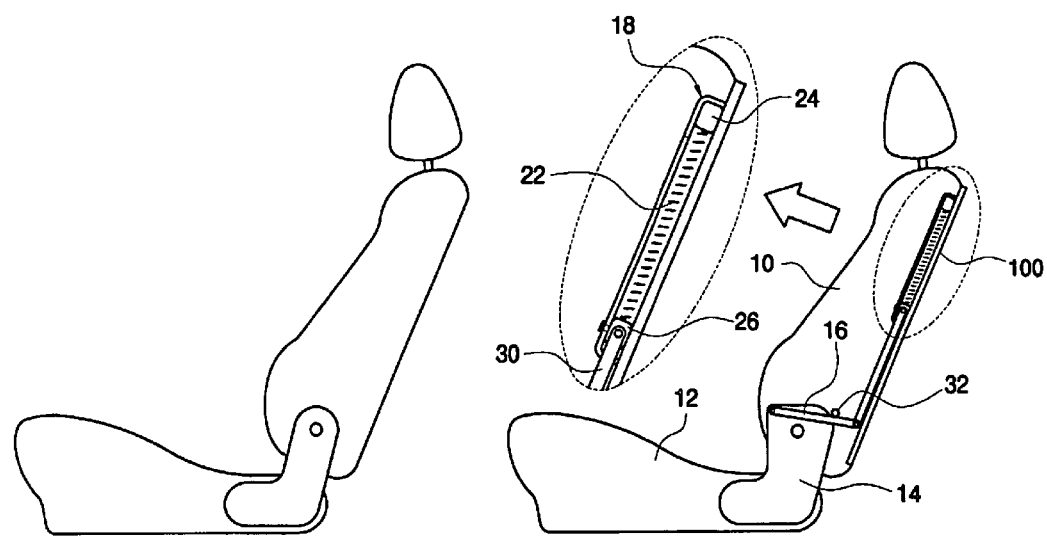
Figure 2B:
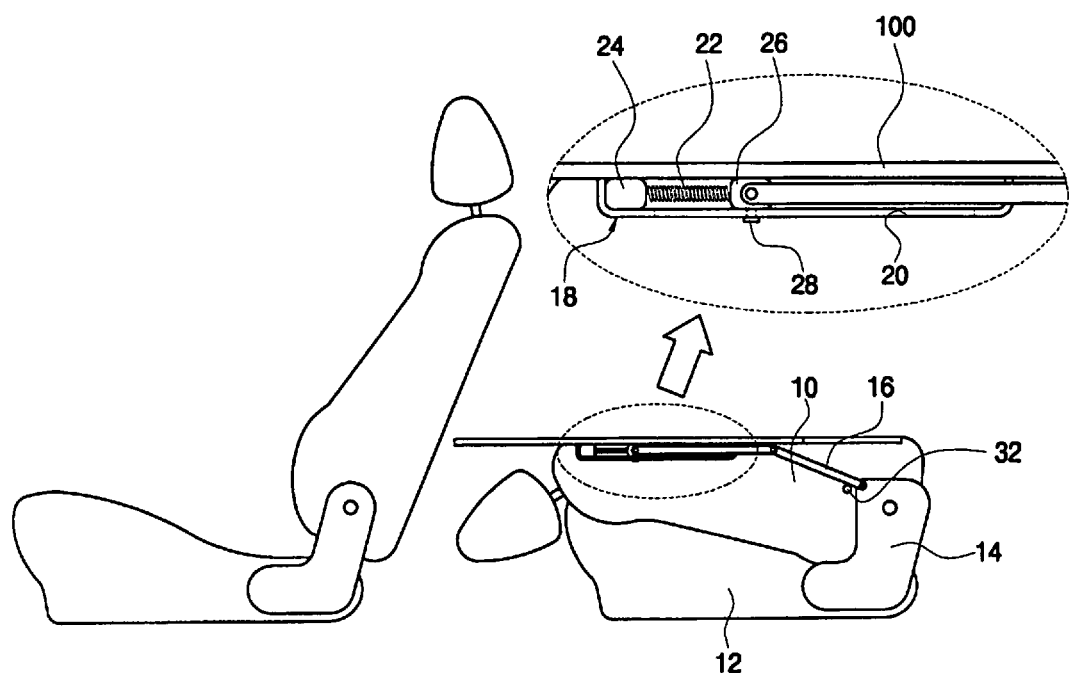

Hereinafter, an operation of the rear seat according to the preferred embodiment of the present invention, which is disclosed above, will be detailed with reference to the accompanying drawings. FIGS. 2a and 2b are side views of the rear seat according to the preferred embodiment of the present invention, wherein FIG. 2a illustrates an initial position of the back board in an upright position of the backrest, and FIG. 2b illustrates a deployment of the back board in a flat position of the backrest.

As shown in FIG. 2a, when the backrest 10 is in an upright position for a passenger, the first link member 16 is restrained by the stopper 32 while the second link member 30 and the sliding member 26 being operative in conjunction with the movement of the first link member 16 extend the spring 22. Namely, in an upright position of the backrest 10, even though the sliding member 26 and the second link member 30 are pulled by the restoring force of the spring 22, those members do not move because the rotation of the first link member 16, operative in conjunction with the sliding member 26 and the second link member 30, is restrained by the stopper 32. Consequently, the back board 100 integrated with the sliding member 26 is not deployed when the backrest 10 is in an upright position.

As shown in FIG. 2b, the first link member 16, the second link member 30, the sliding member 26, and the stopper 32 rotate around the hinge bracket 14 as the backrest is folded into a flat position. Such a movement of the stopper 32 changes the restraining condition of the first link member 16, which leads to movement of the sliding member 26 along the groove 20 by restoring force of the spring 22. Accordingly, the back board 100 integrated with the sliding member 26 is automatically deployed into a position where a gap is formed between the backrest (especially, a headrest mounted on the upper end of the backrest) and the backside of the backrest of a front seat. Therefore, the drawbacks such as falling or sticking of a luggage are effectively prevented. It should be appreciated that the back board 100 automatically returns to the initial position as the backrest 10 of the rear seat is folded up into an upright position.

As described above, the rear seat having a back board according to the present invention is advantageous in that the back board is automatically deployed or accommodated in conjunction with the folding movement of a backrest by employing an elastic member that connects thereto.

Even though the present invention is described in detail with reference to the foregoing embodiments, it is not intended to limit the scope of the present invention thereto. It is evident from the foregoing that many variations and modifications may be made by a person having an ordinary skill in the present field without departing from the essential concept of the present invention.

What is claimed is:

1. A rear seat having a backrest implemented with a back board, comprising:
   a seat cushion;
   a hinge bracket rigidly fixed to a side of said seat cushion;
   a backrest rotatably engaged with said hinge bracket;
   a first link member whose proximal end is rotatably coupled to said hinge bracket;
   a second link member whose proximal end is rotatably connected to a distal end of said first link member;
   a sliding member connected to a distal end of said second link member;
   a rail member for accommodating said sliding member therein, the rail member being installed to a side of said backrest;
   an elastic member whose one end is coupled to said sliding member and the other end is coupled to an upper end of said rail member, the elastic member being compressed or extended in said rail member in accordance with a movement of said sliding member;
   a back board integrally formed with said sliding member; and
   a stopper formed adjacent to a lower end of said backrest, said stopper restraining rotation of said first link member within a certain limit.

2. The rear seat having a backrest implemented with a back board according to claim 1, wherein said sliding member is provided with a hooking member which is integrally formed therewith on the surface facing the rail member, and said rail member is provided with a groove therein along its length, in which said hooking member is slideably inserted.

3. The rear seat having a backrest implemented with a back board according to claim 1, wherein said elastic member is a spring.

4. The rear seat having a backrest implemented with a back board according to claim 1, further comprising a fixing member installed at the upper end of said rail member, wherein the upper end of said elastic member is coupled thereto.

5. A rear seat having a backrest implemented with a back board, comprising:
   a seat cushion;
   a hinge bracket rigidly fixed to said seat cushion;
   a backrest rotatably coupled to said hinge bracket, where said backrest has a front side configured to support a passenger and an opposing back side, wherein said backrest is configured to be folded into a folded position where said front side of said backrest faces said seat cushion;
   a headrest coupled to an upper end of the backrest remote from said hinge bracket;
   a back board slideably coupled to said back side of said backrest; and
   a sliding mechanism coupled between said backrest and said back board, wherein said sliding mechanism is configured to automatically slide said back board over said headrest when said backrest is in said folded position, and wherein said sliding mechanism comprises:
     a first link member whose proximal end is rotatably coupled to said hinge bracket;
     a second link member whose proximal end is rotatably connected to a distal end of said first link member;
     a sliding member connected to a distal end of said second link member;
     a rail member for accommodating said sliding member therein, the rail member being installed to a side of said backrest; and
     an elastic member whose one end is coupled to said sliding member and the other end is coupled to an upper end of said rail member, the elastic member being compressed or extended in said rail member in accordance with a movement of said sliding member, wherein said back board is coupled to said sliding member.

6. The rear seat having a backrest implemented with a back board according to claim 5, further comprising a stopper formed adjacent to a lower end of said backrest, said stopper restraining rotation of said first link member within a certain limit.

7. The rear seat having a backrest implemented with a back board according to claim 5, wherein said sliding member is provided with a hooking member which is integrally formed therewith on the surface facing the rail member, and said rail member is provided with a groove therein along its length, in which said hooking member is slideably inserted.

8. The rear seat having a backrest implemented with a back board according to claim 5, wherein said elastic member is a spring.

9. The rear seat having a backrest implemented with a back board according to claim 5, further comprising a fixing member installed at the upper end of said rail member, wherein the upper end of said elastic member is coupled thereto.

* * * * *